United States Patent
Badewitz

[19]

[11] Patent Number: 5,938,448
[45] Date of Patent: Aug. 17, 1999

[54] HANDY KEYSTROKE ROTARY GUIDE FOR COMPUTER PROGRAMS

[76] Inventor: Charles J Badewitz, 1583 Calle de Andluca, La Jolla, Calif. 92037

[21] Appl. No.: 08/896,089

[22] Filed: Jul. 17, 1997

[51] Int. Cl.⁶ .................................................. G09B 25/00
[52] U.S. Cl. ......................... 434/365; 434/227; 434/402; 400/718
[58] Field of Search .................................. 434/227, 228, 434/365, 402; 345/168; 341/680; 400/716–718.2

[56] References Cited

U.S. PATENT DOCUMENTS

| | | | |
|---|---|---|---|
| 802,717 | 10/1905 | Stevens | 400/718 |
| 962,988 | 6/1910 | Steinmeyer | 400/718 |
| 1,604,914 | 10/1926 | Heebner | 400/718 X |
| 3,611,586 | 10/1971 | Kuramochi | 400/718 X |
| 3,762,529 | 10/1973 | Griffith | 400/718 X |
| 3,971,140 | 7/1976 | Martinez | 434/227 |
| 4,558,527 | 12/1985 | Schroedel et al. | 400/718 X |
| 4,690,644 | 9/1987 | Flanders et al. | 434/227 X |
| 4,935,888 | 6/1990 | Heston et al. | 361/680 |
| 5,040,913 | 8/1991 | Folkens et al. | 400/718.1 |
| 5,080,516 | 1/1992 | Ward | 400/717 |
| 5,201,596 | 4/1993 | Yang | 400/718 |
| 5,376,934 | 12/1994 | Savazzi | 361/680 X |

FOREIGN PATENT DOCUMENTS

| | | | |
|---|---|---|---|
| 0 439 398 A1 | 7/1991 | European Pat. Off. | 400/718 |
| 1-304979 | 12/1989 | Japan | 400/718 |
| WO 83/03797 | 11/1983 | WIPO | 400/718 |

*Primary Examiner*—Joe H. Cheng

[57] ABSTRACT

A universal design of a handy rotary keystrokes guide that simplifies the tasks of personal computer users who prepare spreadsheets, documents, graphs, presentations, reports, etc. It reduces the requirement to remember a multitude of keystrokes and mouse clicks needed to perform hundreds of computer operations and tasks. It provides a convenient display of keystrokes and mouse clicks in a unique, compact, shorthand symbology form and format that is always in the field of view of the computer operator. A one piece cradle supports the rotary guide and enables quick, simple interchange of the rotary keystrokes guides unique to various software programs. Line registration or line magnifier is accomplished by simple attachment to the cradle.

3 Claims, 3 Drawing Sheets

LINE MAGNIFIER

LINE GUIDE

HANDY KEYSTROKE ROTARY GUIDE FOR COMPUTER PROGRAMS

BACKGROUND OF THE INVENTION

The personal computer has become an indispensible tool for many businesses and home users, and is dependent on a large and growing number of special computer programs. Operation of these programs accurately and efficiently burdens the users with a need to remember hundreds of special keystroke and mouse click combinations in order to perform many tasks including tasks of calculating a spreadsheet, adding and deleting columns, erasing or moving data, or recalling data in various files, etc.

If an operator cannot remember the correct combinations of keystrokes and mouse clicks for an operation, he has to interrupt his work, reach for a handbook, consult an index, find the page(s), juggle the book, move his sight from book to keyboard, to monitor, in order to continue work.

Computer and software manufactures have lessened this burden by providing menus, icon, tools, etc., which frequently obscure areas of the monitor screen and require moving amongst menus, sub menus, etc. These are very beneficial. However, in effort to cover all needs and situations, these aids sometimes become unwieldy—like a dictionary filled with so many words than most persons ever use.

Thus, a need remains for quick, reliable access to essential keystrokes and mouse clicks required to perform the many computer operations and tasks.

The general object of this invention is to provide a simple, rotary guide displaying essential keystrokes and mouse clicks for computer software programs in an unique, compact, easily understood "keystrokes shorthand", and, which is constantly in the operator's field of view, and which is easily interchangeability in seconds with other programs guides. Optional vision enhancement and line register is also provided.

DESCRIPTION OF PRIOR ART

The only prior art discovered to date is a type of aid variously referred to as "keyboard templates". The intent of the "templates" appears similar to this invention, however, they are presented in radically different physical form and keystroke guidance. Just as the "Quick Reference" booklets are different from templates. The templates are long, flat, thin, narrow plastic strips with assorted keystroke guides for different software programs. The template keystrokes guides do not appear to be as efficient in shorthand symbology. In addition, a rotary cylinder (as in this invention) with a diameter equal to the height of the template provides three times more keystroke area as the template. Additionally, the template presentations is felt to lack the ease and convenience of this invention.

A review of the following computer related patent classes and subclasses did not reveal any devices similar to that described herein.

| Class | Sub Class |
|---|---|
| 395 | 326, 340, 348, 352 |
| 434 | 118 |
| D14 | 100 |

SUMMARY OF THE INVENTION

The object of the invention is to:

Provide a simple, universal design of a rotary guide for personal computer operators that presents essential keystrokes and mouse clicks for use and execution of their program(s) quickly and efficiently, and without need to interrupt their work to refer to use manuals and books.

Provide the keystroke guides in a form and format that uniquely addresses the myriad of computer programs, such as spreadsheets, charts, word processing, etc. The keystroke guides employ a unique, compact, shorthand symbology that typically reduces essential operations to one to four keystrokes and/or mouse clicks—all presented in easy to read form.

Provide the keystroke guides in physical form with stand or cradle that enables the user to interchange one program guide with another in seconds.

Provide the keystroke guides assembly in a physical form to fit compactly and unobtrusively between the keyboard and the monitor, or on a desktop computer, or monitor, and thereby, is always in the operator's field of view.

Provide the simple attachment of either of two operational clip-on aids:

a) a horizontal line register to ensure the intended set of keystrokes is followed, or b) a horizontal line magnifier for users with less than normal eyesight.

Provide the keystroke guide data to be printed directly on the cylinder, or printed on an adhesive backed label then applied to the cylinder, or printed on cylindrical thermal film which is then heat shrunk onto the cylinder.

DESCRIPTION OF PREFERRED EMBODIMENTS

Figure 1:
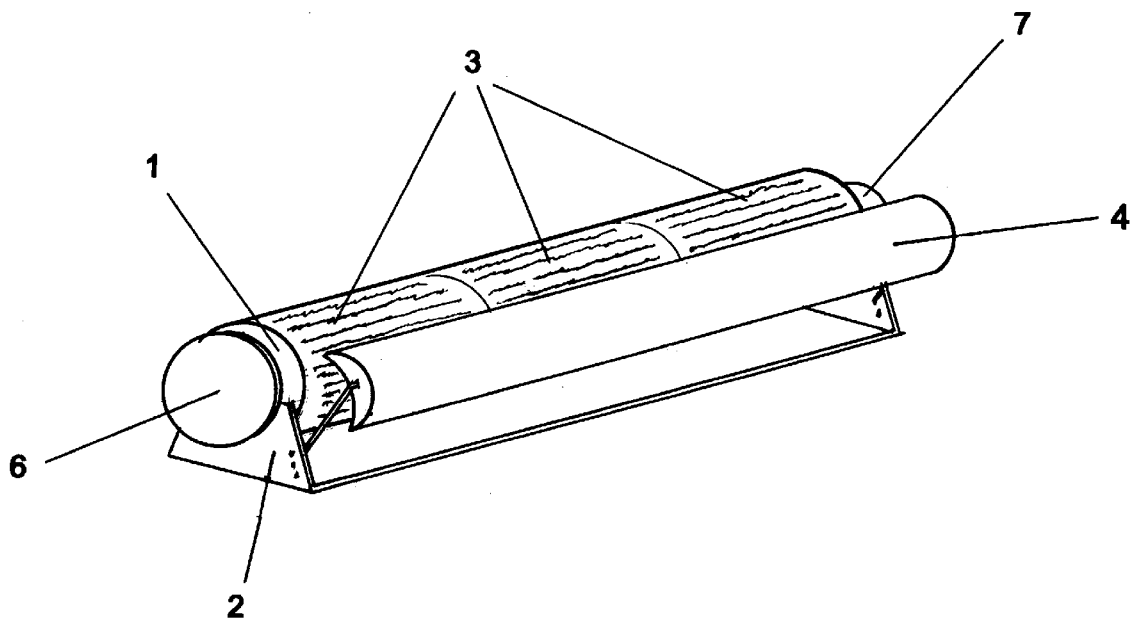
FIG. 1 shows the preferred embodiment of the present invention with its stand or cradle.

FIG. 1 represents the preferred embodiment of the universal rotary keystrokes and mouse clicks guide, where the cylinder is imprinted with the essential keystrokes in a unique, compact, shorthand symbology for computer software programs. Most essential operations are performed in typically one to four keystrokes. A sample of the essential keystrokes follows:

| TASK | ESSENTIAL KEYSTROKES |
|---|---|
| Erase contents of a cell | "delete"↵ |
| Add borders around cells | d/a "format" "cells" 'border' (choose)↵ |

The appropriate software program cylinder or roller is placed into the stand or cradle. It has an integral thumb wheel which enables the operator to rotate and select the desired set of keystrokes. The keystrokes and mouse clicks are printed directly onto the surface of the cylinder, or onto adhesive backed labels, or cylindrical thermal shrink films which are then applied to the cylinder surface.

There are two optional clip-on accessories. One is a linear line register and the other is a linear line magnifier.

The cylinder is normally maintained in its position by gravitational force. The line register or magnification accessories are maintained in either the "use" position or "retract" position by gravitational or spring forces. The complete assembly may be placed between the keyboard and monitor, or on top a desk top computer, or on top of the monitor. It is maintained in its positions by gravity or by adhesive.

FIG. 1 shows the complete rotary keystrokes guide as comprised of: the cylinder or roller (1) with the integral thumb wheel (6), integral extended stub axles (7), essential keystrokes (3), the stand or cradle (2), and optionally installed line magnifier (4).

Figure 2:
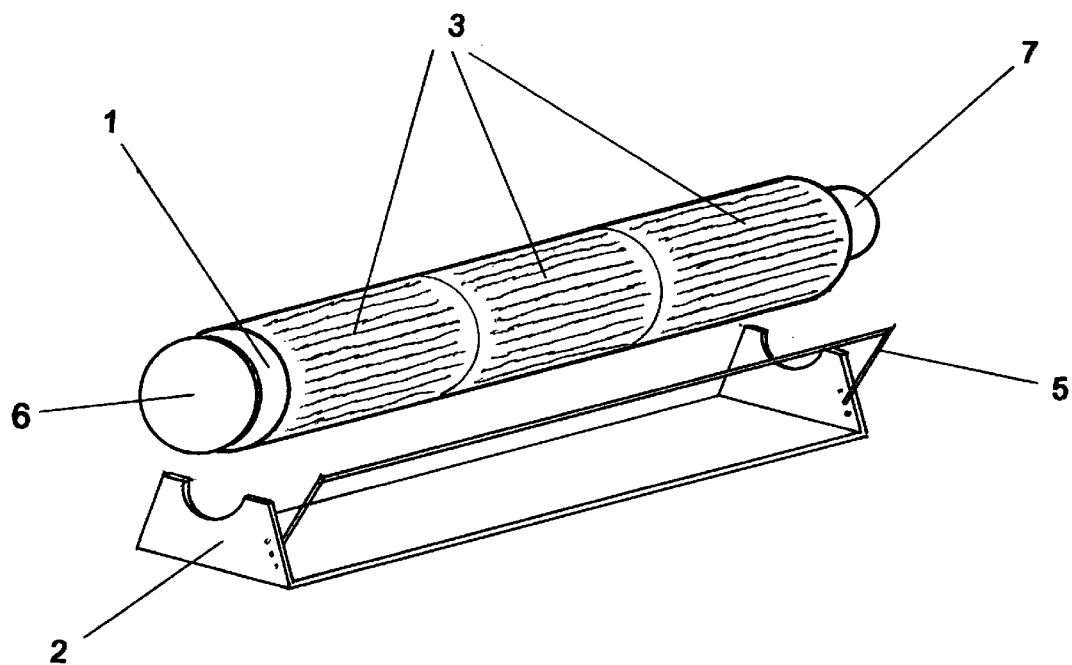
FIG. 2 depicts the cylinder in a position slightly displaced above the stand or cradle.

FIG. 2 shows the cylinder or roller (1) vertically displaced from the stand or cradle (2) (to illustrate the ease of insertion or removal), essential keystrokes (3), the integral thumb wheel (6), the integral extended stub axles (7), the stand or cradle (2), and optionally installed line register (5). The cylinder is a one piece, thin walled, molded plastic unit. The cradle is also plastic. The optional accessories are made of a combination of plastic and thin metal rods formed to shape.

The complete assembly of the preferred embodiment is of such dimensions as to display the essential keystrokes and mouse clicks for various software programs and presented in easily readable symbology and print size, and is also be geometrically compatible with the space between the monitor and keyboard for typical personal computer configurations.

Figure 3:
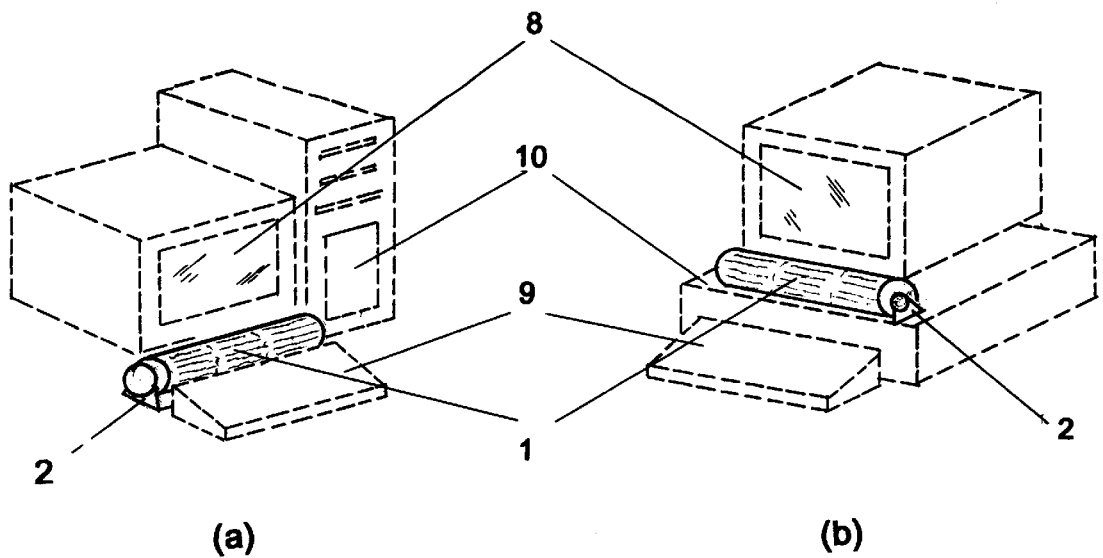
FIGS. 3(a) and (b) illustrate the present invention located integrally with the two most common configurations of personal computers.

FIGS. 3(a) and (b) illustrate the easy and convenient location of the rotary keystrokes guide with the computer (10), between the monitor (8), and keyboard (9), and how the invention is integrated into the operators field of view during use. In certain cases the assembly may be mounted on top of the monitor.

Figure 4:
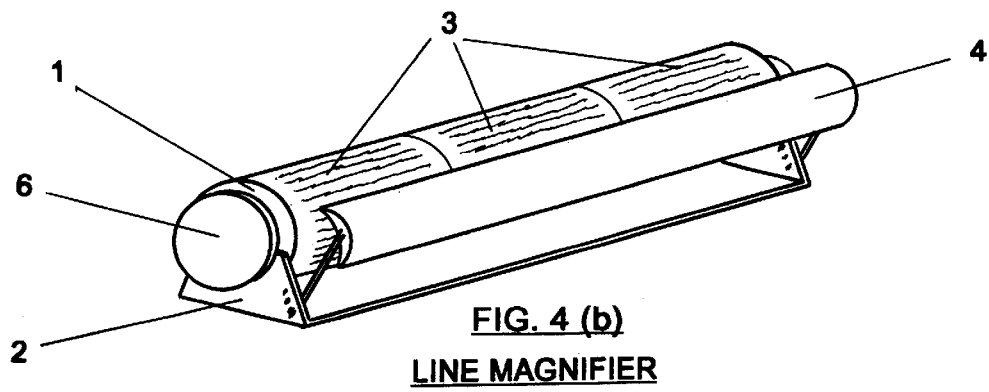
FIGS. 4(a) and (b) illustrate the installation and use of the two optional attachments for line registration or magnification of the keystrokes.
Figure 4:
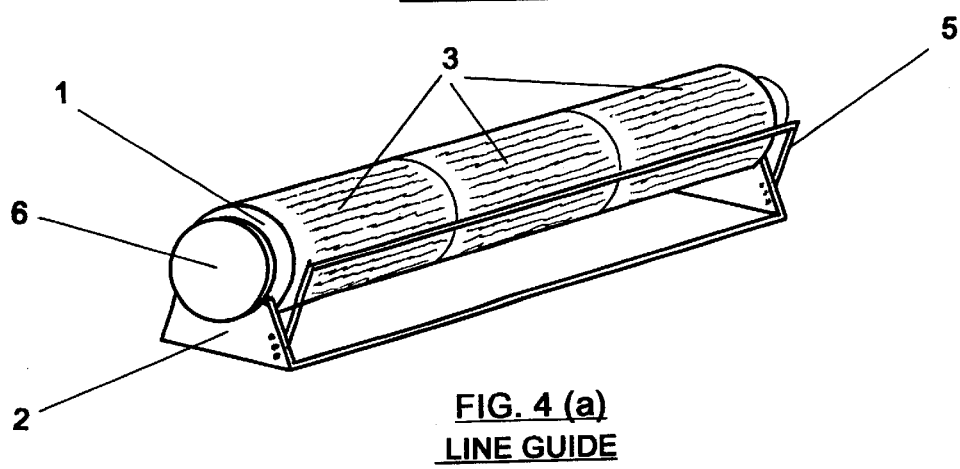

FIG. 4(a) illustrates the simple snap-in installation of the line register (5) to the stand or cradle (2). The dimensions and weight are such that the line register (5) is retained in either of two positions by force of gravity or springs. The "use" position hold the horizontal line register just off the surface of the cylinder or roller (1), and serves as a visual underlining register to which operator brings the desired keystrokes for easy reference. The stowed position moves the horizontal metal rod away from the cylinder or roller, and enables easy removal of the cylinder or roller and replacement.

FIG. 4(b) illustrates the same simple snap-in installation of the linear line magnifier (4). It has the same two positions as the line register and is used the same way. Each of these is adjustable for the comfort of the operator by selecting the appropriate sets of snap-in-holes.

Figure 5:
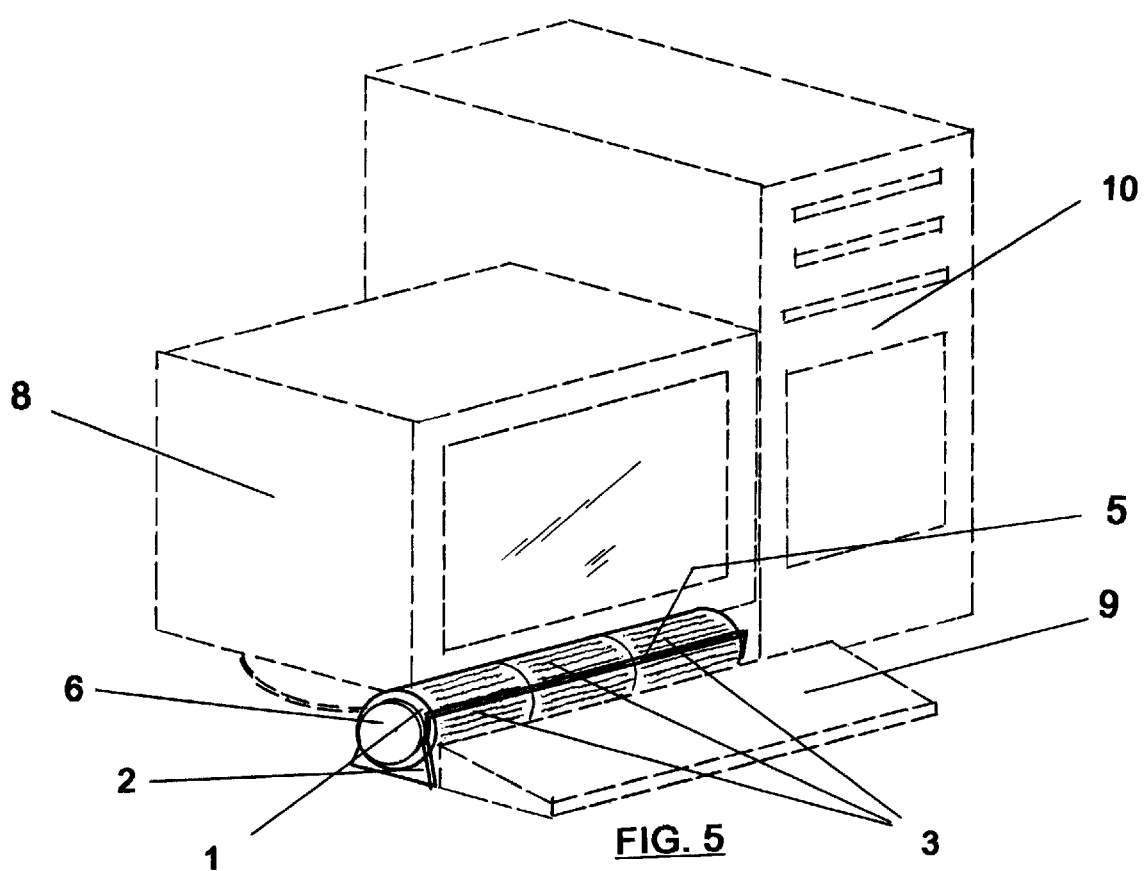
FIG. 5 illustrates the present invention in typical work location relative to the computer, keyboard and monitor.

FIG. 5 illustrates the rotary keystrokes guide in a typical work position relative to a personal computer, keyboard and monitor.

Accordingly, the scope of the invention should be determined not only by the embodiments illustrated, but by the appended claims and their legal equivalents.

What I claim is:

1. A simple, handy, rotary reference guide for personal computer operators, said guide comprising:

a) a plurality of different size and interchangeable one piece, thin walled, light weight plastic cylindrical horizontally disposed roller, each of said roller having a thumb wheel integral formed on one end of said roller and a stub axle integrally formed and extend on the other end of said roller, wherein the surface of each one of said plurality of roller having tables of reference guide imprinted thereon for presenting at least one of the essential programmed operations of the personal computer, and wherein said tables of reference guide is in a unique, compact, short form and format that efficiently combines keystrokes, mouse clicks, menus, submenus, icons, and tools, complete with an integral legend defining the symbols and format for the personal computer programs;

b) a one piece cradle for supporting one of said plurality of roller thereon and enabling rotation of said roller by turning said thumb wheel of said roller, and for selectively positioning said roller in a convenient viewing position; and c) a visual guide clipped to the cradle for providing eye registration and enhancing vision for the users;

wherein said cradle is free standing cradle or adhesive bottomed cradle, and wherein said convenient viewing position is in physical space and location between the monitor and keyboard, or on top of a desktop personal computer, or on the monitor, or other convenient viewing position, thereby eliminating the need for the personal computer operators to interrupt their performance to consult a user book or manual and translate the written text into essential keystrokes and mouse click.

2. The handy key-stroke rotary guide of claim 1 wherein said tables of references imprinted on said surface of each one of said plurality of roller is selected from the group consisting of the tables directly printed on said surface of said roller, the application of adhesive backed printed labels, and cylindrical thermal shrink film imprinted with the tables.

3. The handy key-stroke rotary guide of claim 1 wherein said visual guide is an adjustable line register or an adjustable line magnifier.

* * * * *